Figure 1:
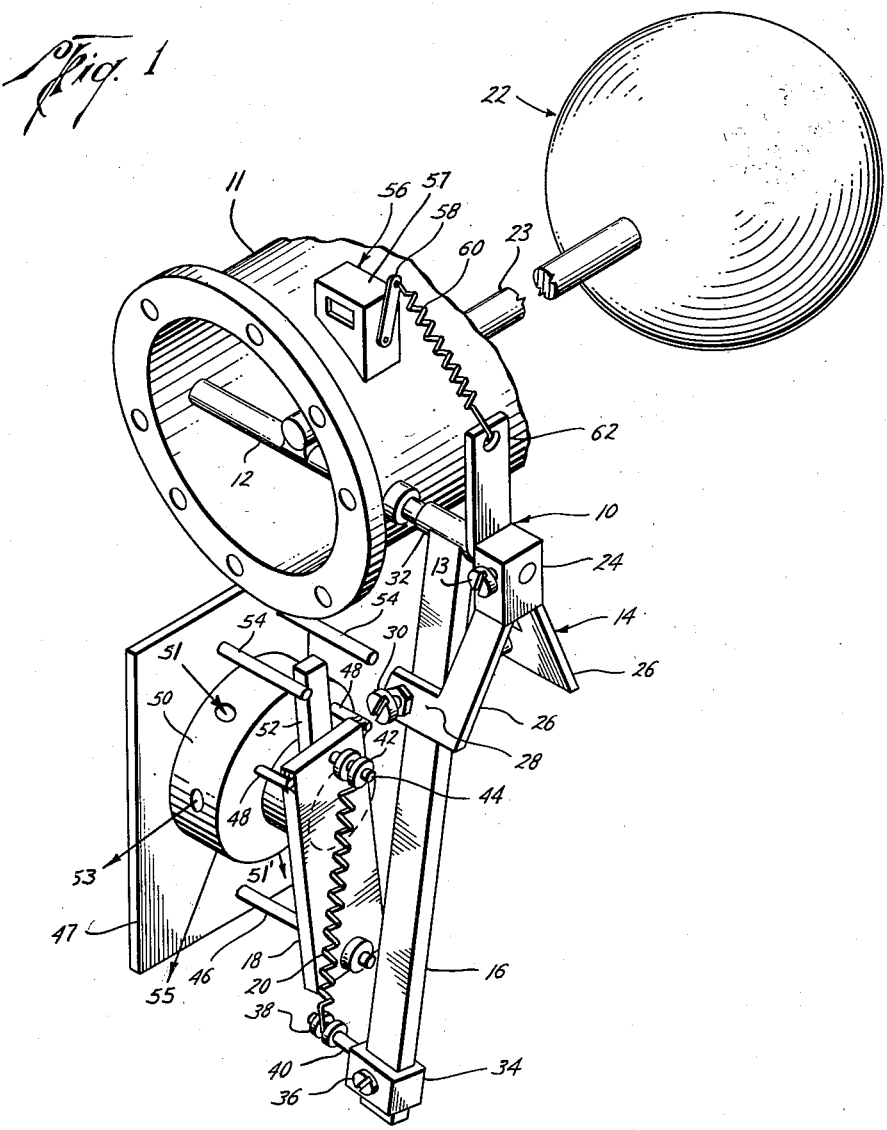

Jan. 7, 1958

H. V. SMITH ET AL 2,818,738

SNAP ACTING MECHANISM

Filed April 5, 1957

2 Sheets-Sheet 1

Horace V. Smith
George A. Repal
INVENTORS

BY

ATTORNEYS

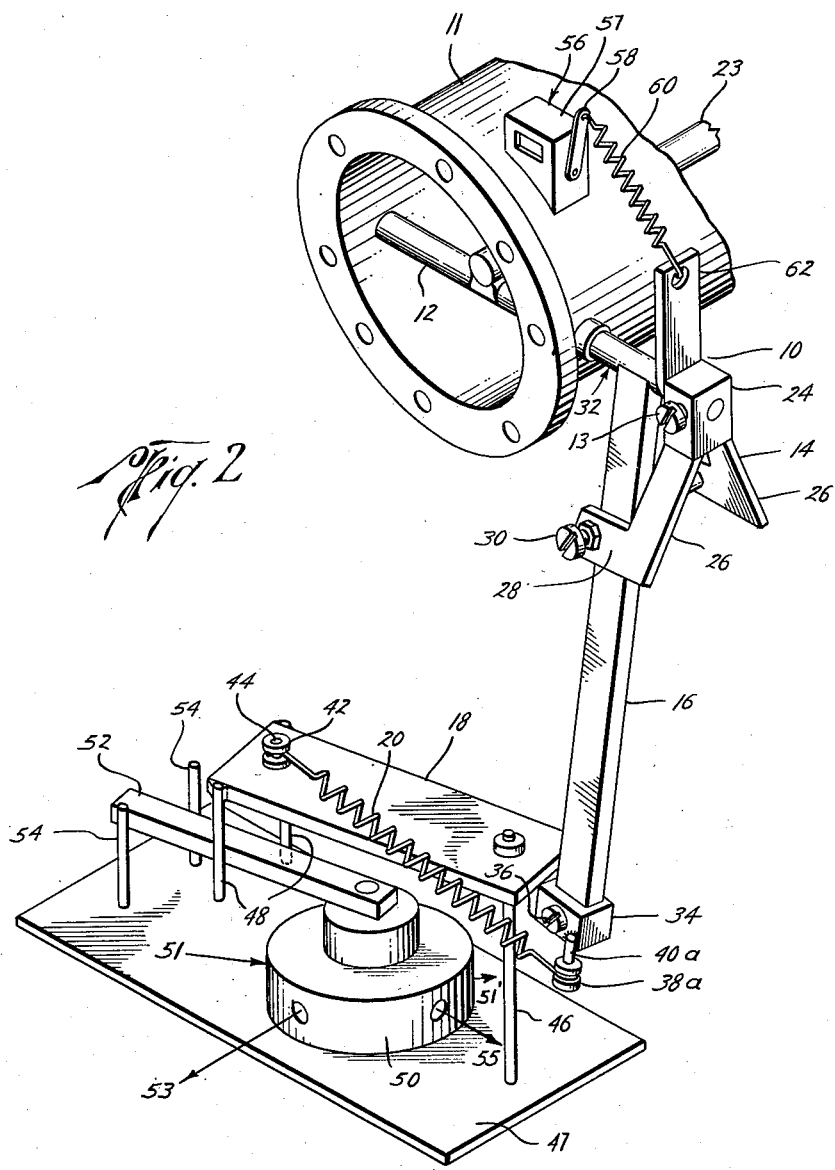

United States Patent Office 2,818,738
Patented Jan. 7, 1958

2,818,738

SNAP ACTING MECHANISM

Horace V. Smith and George A. Repal, Houston, Tex., assignors to Oil Metering and Processing Equipment Corporation, Houston, Tex., a corporation of Texas Application April 5, 1957, Serial No. 651,026

11 Claims. (Cl. 74—97)

The present invention relates to a snap acting mechanism and more particularly, relates to linkage which will convert a torque action at a predetermined angular position into a positive low friction snap action actuating a control.

This is a continuation in part of co-pending applications, Serial No. 517,506, filed June 23, 1955, for a Liquid Metering Apparatus, and Serial No. 615,886, filed October 15, 1956, for a Liquid Metering Separator.

In operation today are numerous pieces of equipment, such as liquid metering equipment, in which a vessel is filled and emptied with a liquid with valves being opened and closed through the movement of a float in the vessel so that the vessel empties when the float is at an upper position and begins to fill when the float is in a lower position. In such equipment it is necessary to have a control arrangement which through the movement of the float will open and close the valves at the proper time. One such type of control arrangement is illustrated in Patent No. 901,190, issued October 13, 1908, to A. L. Riggs for a Steam Trap.

In many operations, such as liquid metering, it is necessary that the liquid level in the vessel be controlled accurately and to do this there is a need for a simple snap acting mechanism or linkage which has low friction and will actuate the control at definite positions of liquid level. Friction in such snap acting mechanism is definitely undesirable as it results in variances in the height of liquid level necessary to cause actuation of the control and thus inaccuracies. Further, "creeping" of the control from one position to another is recognized as undesirable especially where the control is a valve assembly such as a pilot valve as such creeping often causes leakage of pressure. In attempting to solve the problem of creeping and yet have a simple mechanism, such mechanisms usually have structures that introduce undesirable friction into them.

Accordingly, it is the general object of the present invention to provide a simple, inexpensive, and accurate snap acting mechanism.

Another object of the present invention is to provide such a snap acting mechanism which prevents creeping of the control and has low friction.

A still further object of the present invention is to provide such a snap acting mechanism that is adjustable to convert a torque movement of a predetermined angular position into a positive low friction snap action actuating a control.

Other and further objects, features and advantages will be apparent from the following description of the presently preferred examples of the invention, given for the purpose of disclosure and taken in conjunction with the accompanying drawings where like character references designate like parts throughout the several views and where Figure 1 is a perspective view illustrating a presently preferred form of a snap acting mechanism of the present invention, and Figure 2 is a perspective view illustrating a modification of a snap acting mechanism of the present invention.

Referring now to the drawings and particularly to Figure 1, the snap acting mechanism indicated generally by the numeral 10 includes as a whole the control member or rock shaft 12 mounted for oscillating rotatable movement such as through a tubular nozzle 11 opening into a liquid metering chamber, not shown; an adjustable engaging member 14 secured on an end of the rock shaft 12 extending from the nozzle 11; a swing arm 16 pivotally mounted on the rock arm 12 for independent rotation therewith; and resilient tension linkage 20 adjustably secured to the swing arm 16 and to a pivot arm 18 actuating a control.

The rock shaft 12 is pivotally mounted in any conventional way and may be oscillatably rotated such as by movement of the float 22 on the float arm 23 which is rigidly secured to the rock shaft 12. Thus, in this example, as the float 22 rises and falls with changes of liquid level the float arm 23 causes an oscillating rotation of the rock shaft 12.

The engaging member 14 is rigidly secured, such as by set screw 13, to the end of the rock shaft 12 extending from the nozzle 11 for rotation therewith and includes a generally U-shaped bracket formed of a pair of generally L-shaped brackets 26. Disposed in the free end 28 of each L-shaped bracket 26 is a screw 30 by which suitable adjustment may be made for calibrating the snap acting mechanism 10 as will be presently described. Rotatably secured at its upper end, such as by the journal bearing 32, and passing between the L-shaped brackets 26 is the downwardly extending swing arm 16 on the lower end of which is a slidable sleeve 34 which may be secured in any position along the arm 16 by means of the adjusting screw 36. A rotatable sleeve 38 to help reduce friction is secured on a pin 40 secured to and extending from the slidable sleeve 34. One end of resilient tension linkage such as a tension spring 20 is secured in a groove on this rotatable sleeve 38 and the upper end is secured in a similar grooved rotatable sleeve 42 attached to a pin 44 extending from the pivot arm 18. The pivot arm 18 is pivotally mounted such as by the shaft 46 mounted in a plate 47 of a control such as a pilot valve 50. Secured to and projecting from the upper end of the pivot arm 18 is a pair of spaced projections 48 forming contact members that straddle the pilot actuating arm 52 of the pilot valve 50 and strike the pilot actuating arm 52 when the pivot arm 18 is moved from side to side thereby moving the pilot actuating arm 52 and actuating the pilot valve 50. In the pilot valve 50, here illustrated, a gas supply line 51 supplies pressure to the pilot valve 50 with the pressure being selectively directed therefrom through the outlet lines 53 and 55 by the movement of the pilot actuating arm 52. In operation, a conventional exhaust port 51' permits back pressure to drain from the line 53 or 55 not then being supplied with fluid pressure.

In the form shown in Figure 1 it is to be noted that the pivot arm 18 and the swing arm 16 are mounted for movement parallel to one another. Further, the tension spring 20 is connected to the swing arm 16 on one side of the shaft 46 forming the pivot point of the pivot arm 18 and connected to the pivot arm 18 on the other side of the shaft or pivot point 46. Thus, the tension of the spring 20 tends to hold the pivot arm 18 on whatever side of the shaft 46 the lower end of the spring 20 is at that time.

To prevent the pivot arm 18 from damaging the pilot valve 50 when the pilot actuating arm 52 is thrown from side to side by the projections 48, a pair of stops 54 extend outwardly from the plate 47 on each side of the pilot actuating arm 52. These stops 54 are spaced so that the pilot actuating arm 52 has sufficient movement to operate the pilot valve 50, but are placed close enough together to prevent damage to the control.

In operation of the snap acting mechanism, the rock shaft 12 is oscillatably rotated such as by means of a vertical swinging movement of the float 22. A corresponding movement is transmitted to the L-shaped brackets 26 through the link or hanger 24. This causes alternate inner ends of the set screws 30 after predetermined movement to contact the swing arm 16 and swing it first in one direction and then in the other in response to the movement of the float 22 as described. As the swing arm 16 moves from one side to the other tension on the spring 20, when it passes the straight line through the shaft 46 and the pin 44, snaps the pivot arm 18 from one extreme position to the other. As the pivot arm 18 is oscillated on its shaft 46 the projections 48 strike the pilot actuating arm 52 actuating the control here shown as the pilot valve 50.

It will be noted that the projections 48 are spaced farther apart than the width of the pilot actuating arm 52 so that only one such projection 48 is in contact with the pilot actuating arm 52 at any one time and there is a space between the pilot actuating arm 52 and the other projection 48. Because the pivot arm 18 contacts the pilot actuating arm 52 only by the projections 48, if there should be any creeping of the pivot arm 18 before the spring 20 passes the shaft 46 such motion is not transmitted to the pilot actuating arm 52 because the particular projection 48 which will strike the pilot actuating arm 52 is spaced from it. This lost motion between the pivot arm 18 and the pilot actuating arm 52 in the event there should be any creeping of the pivot plate 18, together with the action of the spring 20, prevent any creeping of the control and the control is snap acted by the striking of one of the projections 48 when the tension of the spring 20 finally snaps the pivot arm 18.

Varying the distance between the inner ends of the screws 30 and the swing arm 16 calibrates the snap acting mechanism 10 by varying the angular rotation of the rock shaft 12 necessary to cause contact between the engaging member 14 and the swing arm 16. Also, adjustment of the slidable sleeve 34 along the swing arm 16 adjusts the tension on the spring 20.

This snap acting mechanism is especially useful in a liquid metering apparatus as it provides a highly accurate and efficient valve actuating mechanism. When used in connection with a fluid metering apparatus a dump counter or recorder mechanism 56 is provided so that an accurate count is automatically maintained each time a liquid apparatus fills and empties. Such dump counter or recorder mechanism may include a conventional counter 57 having its actuator arm 58 secured by a tension spring 60 to the end of the arm 62 which is rigidly secured to the rock shaft 12 and oscillates therewith so that oscillations of the arm 62 through the action of the spring 60 causes oscillations of the actuator arm 58 recording the number of times the liquid apparatus empties and fills. Any conventional counter or recorder mechanism may be used, a number of which are on the commercial market and, accordingly, no detailed description thereof is necessary.

Referring now to Figure 2, the modification there illustrated is identical to the form shown in Figure 1 except that all parts to the left (as viewed in Figure 1) of the swing arm 16 have been rotated 90 degrees to the left so the spring 20 and the pivot arm 18 move in a plane perpendicular to the plane in which the swing arm 16 moves as distinguished from a parallel plane as illustrated in Figure 1. Also the pin 40a has been turned downwardly 90 degrees to accommodate the new position of the spring 20. The operation of this modification is the same as the form shown in Figure 1 as the tension spring 20 still swings across the face of the pivot arm 18 from one side of the pivot shaft 46 to the other.

These two positions of the pivot arm 18 with relation to the swing arm 16 are the most friction free positions and thus are the preferred forms.

While the present invention has been described in connection with metering and with the operation of a pilot valve, it will be understood that the invention may be used in other assemblies and in conjunction with other controls than a pilot valve. In addition, certain rearrangements of parts and substitutions of parts will readily suggest themselves to those skilled in the art which are encompassed within the spirit of the invention and the scope of the appended claims.

The present invention therefore is well suited to carry out the objects and attain the advantages and ends mentioned as well as others inherent therein. Accordingly, the invention is to be limited only by the spirit thereof and the scope of the appended claims.

What is claimed is:

1. A snap acting mechanism for snapping a first arm from one side to another by movement of a rotatably oscillating control member, said mechanism comprising, an adjustable engaging member secured to the control member for movement therewith, a second arm mounted for rotation on the control member and movable by the adjustable engaging member upon predetermined movement of the engaging member, a third arm pivotally mounted for oscillating movement about its pivot mount, contact means on the third arm adapted to contact and move the first arm, and resilient tension means connected to a point on the second arm on one side of the pivotal mount of the third arm and to a place on the third arm remote from its pivotal mount whereby movement of the second arm by the adjustable engaging member snaps the first arm from one position to another through its contact with the contact means.

2. The invention of claim 1 in which the resilient means is adjustably connected to the second arm.

3. The invention of claim 1 in which the contact means are spaced contact members.

4. The invention of claim 1 in which the resilient means is a spring adjustably connected to the second arm and the contact means on the third arm are spaced contact members.

5. A snap acting mechanism for snapping a first arm from one side to another by movement of a rotatably oscillating control member, said mechanism comprising, a substantially U-shaped bracket secured to the control member for movement therewith, a second arm mounted for rotation on the control member and passing between opposite sides of the U-shaped bracket, adjusting means selectively varying the distance between opposite sides of the bracket and the second arm, a third arm pivotally mounted for oscillating movement about its pivot mount, spaced contact members on said third arm adapted to contact and move said first arm, and resilient tension means connected to said second arm at a point on one side of the pivot mount of the third arm and connected to the third arm at a point remote from its pivot mount whereby movement of the second arm by the bracket snaps the third arm from one position to another thereby snapping the first arm from one position to another through its contact with the spaced contact members.

6. The invention of claim 5 in which the resilient tension means is a spring.

7. The invention of claim 5 including stops disposed on either side of the first arm limiting its movement.

8. The invention of claim 5 in which the second and third arms move in approximately parallel planes.

9. The invention of claim 5 in which the second and third arms move in planes approximately perpendicular to each other.

10. A snap acting control mechanism for snapping a first arm from one side to another upon movement of a lever, said mechanism comprising, a rotatably oscillating control member secured to said lever and oscillatably rotated thereby, an adjustable engaging member secured to the control member for movement therewith, a second arm mounted for rotation on the control member and movable by the adjustable engaging member upon predetermined movement of the engaging member, a third arm pivotally mounted for oscillating movement about its pivot mount, contact means on the third arm adapted to contact and move the first arm, and resilient tension means connected to a point on the second arm on one side of the pivotal mount of the third arm and to a point on the third arm remote from its pivotal mount whereby movement of the second arm by the adjustable engaging member snaps the first arm from one position to another through its contact with the contact means on the third arm.

11. A snap acting mechanism for snapping a first arm from one side to another by movement of an oscillating control member, said mechanism comprising, an engaging member secured to the control member for movement therewith, a second arm pivotally mounted and engageable and movable by the engaging member upon predetermined movement of the engaging member, a third arm pivotally mounted for oscillating movement about its pivot mount, contact means on the third arm adapted to contact and move the first arm, and resilient tension means connected to a point on the second arm on one side of the pivotal mount of the third arm and to a place on the third arm remote from its pivotal mount whereby movement of the second arm by the engaging member snaps the first arm from one position to another through its contact with the contact means.

No references cited.